(12) United States Patent
Eo et al.

(10) Patent No.: US 10,955,029 B2
(45) Date of Patent: Mar. 23, 2021

(54) DUAL CLUTCH TRANSMISSION FOR VEHICLE

(71) Applicants: Hyundai Motor Company, Seoul (KR); Kia Motors Corporation, Seoul (KR)

(72) Inventors: Soon Ki Eo, Ansan-si (KR); Woo Churl Son, Seongnam-si (KR); Il Han Yoo, Hwasun-eup (KR); Min Ho Chae, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 16/282,584

(22) Filed: Feb. 22, 2019

(65) Prior Publication Data
US 2020/0124140 A1    Apr. 23, 2020

(30) Foreign Application Priority Data
Oct. 17, 2018 (KR) .......................... 10-2018-0123774

(51) Int. Cl.
*F16H 3/08* (2006.01)
*F16H 57/00* (2012.01)
*F16H 3/00* (2006.01)

(52) U.S. Cl.
CPC ............... *F16H 3/08* (2013.01); *F16H 3/006* (2013.01); *F16H 57/0037* (2013.01); *F16H 2306/40* (2013.01); *F16H 2708/24* (2013.01)

(58) Field of Classification Search
CPC .................... F16H 2003/0803; F16H 57/0037
See application file for complete search history.

(56) References Cited

U.S. PATENT DOCUMENTS

| | | |
|---|---|---|
| 2006/0266144 A1 | 11/2006 | Schafer et al. |
| 2010/0263465 A1 | 10/2010 | Enstroem et al. |
| 2011/0088509 A1 | 4/2011 | Mohlin et al. |
| 2016/0230845 A1* | 8/2016 | Eo ........................... F16H 3/006 |
| 2016/0230846 A1* | 8/2016 | Eo ........................... F16H 3/006 |
| 2017/0138441 A1 | 5/2017 | Singh |
| 2019/0009666 A1* | 1/2019 | Eo ......................... B60W 30/20 |
| 2019/0168599 A1* | 6/2019 | Eo .......................... B60K 6/387 |

(Continued)

FOREIGN PATENT DOCUMENTS

| | | | | |
|---|---|---|---|---|
| DE | 102012024091 A1 * | 6/2014 | ............ | F16H 3/006 |
| JP | 2007-225040 A | 9/2007 | | |

(Continued)

*Primary Examiner* — Terence Boes
(74) *Attorney, Agent, or Firm* — Morgan, Lewis & Bockius LLP

(57) ABSTRACT

A dual clutch transmission for a vehicle may include a first input shaft to which a first clutch is connected; a second input shaft connected to a second clutch and disposed coaxially with the first input shaft; a first output shaft, a second output shaft and a third output shaft disposed in parallel with the first input shaft and the second input shaft; and a combined gear group including two pairs of external gears configured to be connected in series to each other or disconnected from each other so that power of the first input shaft is decelerated in two steps using the first output shaft to enable the second input shaft to be driven in a direction in which the first input shaft is driven.

17 Claims, 13 Drawing Sheets

(56) References Cited

U.S. PATENT DOCUMENTS

| | | | |
|---|---|---|---|
| 2020/0047602 A1* | 2/2020 | Chae | F16H 3/093 |
| 2020/0271196 A1* | 8/2020 | Eo | F16H 3/006 |
| 2020/0271197 A1* | 8/2020 | Eo | F16H 3/006 |

FOREIGN PATENT DOCUMENTS

| | | |
|---|---|---|
| JP | 2016-537575 A | 12/2016 |
| KR | 10-2010-0088731 A | 8/2010 |
| KR | 10-1551005 B1 | 9/2015 |
| KR | 10-1679967 B1 | 11/2016 |
| WO | WO 2015/070958 A1 | 5/2015 |

* cited by examiner

FIG. 11

| GEAR SHIFT STAGE | CLUTCH | | S1 | | | S2 | | | S3 | | | ST | | SR | |
|---|---|---|---|---|---|---|---|---|---|---|---|---|---|---|---|
| | CL1 | CL2 | 5 | N | 2 | 7 | N | 3 | 6 | N | 4 | N | 6 | N | R |
| R STAGE | ● | × | | ● | | | ● | | | ● | | | ● | | ● |
| N STAGE | × | × | | ● | | | ● | | | ● | | | ● | ● | |
| 1 STAGE | ● | × | | | ● | | ● | | | ● | | | ● | ● | |
| 2 STAGE | × | ● | | | ● | | ● | | | ● | | ● | | ● | |
| 3 STAGE | ● | × | | ● | | | | ● | | ● | | ● | | ● | |
| 4 STAGE | × | ● | | ● | | | ● | | | | ● | ● | | ● | |
| 5 STAGE | ● | × | ● | | | | ● | | | ● | | ● | | ● | |
| 6 STAGE | × | ● | | ● | | | ● | | ● | | | | ● | ● | |
| 7 STAGE | ● | × | | ● | | ● | | | | ● | | ● | | ● | |
| 8 STAGE | × | ● | ● | | | | ● | | | ● | | | ● | ● | |

DUAL CLUTCH TRANSMISSION FOR VEHICLE

CROSS REFERENCE TO RELATED APPLICATION

The present application claims priority to Korean Patent Application No. 10-2018-0123774 filed on Oct. 17, 2018, the entire contents of which is incorporated herein for all purposes by this reference.

BACKGROUND OF THE DISCLOSURE

Field of the Disclosure

The present invention relates to a dual clutch transmission for a vehicle, and more particularly, to a configuration of dual clutch transmission.

Description of Related Art

The more a transmission of a vehicle is implemented in multi-stages, the more efficient operation of the engine becomes possible, which can ultimately improve the fuel efficiency of the vehicle.

Meanwhile, a dual clutch transmission employs a synchromesh type gear shift mechanism in which external gears that are always geared with to each other are selected by a synchronizer to perform a gear shift, and is configured to perform the gear shift using two clutches which are connected to two input shafts, respectively. Such the dual clutch transmission achieves power transmission efficiency at the level of a manual transmission, but also prevents torque interruption caused by disconnection of torque transferred to drive wheels when a gear shift is performed, improving a gear shift feeling.

Accordingly, if as many gear shifting stages as possible may be implemented using the above described dual clutch transmission, high power transmission efficiency and efficient operation of an engine can remarkably improve fuel efficiency a vehicle while ensuring an excellent gear shift feeling.

However, even when multiple gear shifting stages are achieved in the dual clutch transmission, a length of the transmission is increased, which causes a problem that mountability to a vehicle deteriorates.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dual clutch transmission for a vehicle which can implement a plurality of gear shifting stages to improve fuel efficiency of a vehicle and can have a relatively short overall length to secure vehicle mountability.

In various aspects of the present inventions, a dual clutch transmission for a vehicle according to an exemplary embodiment of the present invention may include a first input shaft to which a first clutch is connected; a second input shaft connected to a second clutch and disposed coaxially with the first input shaft; a first output shaft, a second output shaft and a third output shaft disposed in parallel with the first input shaft and the second input shaft; and a combined gear group including two pairs of external gears configured to be connected in series to each other or disconnected from each other so that power of the first input shaft is decelerated in two steps using the first output shaft to enable the second input shaft to be driven in a direction in which the first input shaft is driven.

The combined gear group may include one pair of external gears including a third-stage driving gear mounted on the first input shaft and a third-stage driven gear mounted on the first output shaft to enable a third-gear shifting stage of a series of gear shifting stages to be implemented; the other pair of external gears including a sixth-stage driven gear mounted on the first output shaft and a sixth-stage driving gear mounted on the second input shaft to enable a sixth-gear shifting stage of a series of gear shifting stages to be implemented; and a series synchronizer provided to enable the third-stage driven gear and the sixth-stage driven gear to be connected to or disconnected from each other.

The third-stage driving gear may be disposed on the first input shaft in a state in which rotation thereof is restricted; the third-stage driven gear and the sixth-stage driven gear may be rotatably disposed on the first output shaft; and the sixth-stage driving gear may be disposed on the second input shaft in a state in which rotation thereof is restricted. Furthermore, a fifth-seventh-stage driving gear is mounted on the first input shaft in a state in which rotation thereof may be restricted, to implement a fifth-gear shifting stage and a seventh-gear shifting stage of a series of gear shifting stages; a seventh-stage driven gear geared with the fifth-seventh-stage driving gear may be rotatably disposed on the first output shaft; and a fifth-stage driven gear geared with the fifth-seventh-stage driving gear may be rotatably disposed on the second output shaft.

A second-stage driving gear configured for implementing a second-gear shifting stage of a series of gear shifting stages and a fourth-stage driving gear configured for implementing a fourth-gear shifting stage may be fixed on the second input shaft; a fourth-stage driven gear geared with the fourth-stage driving gear may be rotatably disposed on the first output shaft; and a second-stage driven gear geared with the second-stage driving gear may be rotatably disposed on the second output shaft.

The dual clutch transmission for a vehicle may further include a first synchronizer provided to enable any one of the second-stage driven gear and the fifth-stage driven gear to be connected to the second output shaft; a second synchronizer provided to enable any one of the third-stage driven gear and the seventh-stage driven gear to be connected to the first output shaft; and a third synchronizer provided to enable any one of the fourth-stage driven gear and the sixth-stage driven gear to be connected to the first output shaft.

In a state in which the series synchronizer connects the third-stage driven gear and the sixth-stage driven gear and the first synchronizer connects the second-stage driven gear to the second output shaft, the power of the first input shaft may be sequentially transferred to the third-stage driving gear, the third-stage driven gear, the sixth-stage driven gear, the sixth-stage driving gear, the second-stage driving gear and the second-stage driven gear to form output with a first stage gear shift ratio to the second output shaft.

In a state in which the series synchronizer connects the third-stage driven gear and the sixth-stage driven gear and the first synchronizer connects the fifth-stage driven gear to the second output shaft, the power of the second input shaft may be sequentially transferred to the sixth-stage driving gear, the sixth-stage driven gear, the third-stage driven gear, the third-stage driving gear 3D, the fifth-seventh-stage driving gear and the fifth-stage driven gear to form the output with an eighth stage gear shift ratio to the second output shaft.

A reverse driving gear may be integrally formed on the second-stage driven gear for implementing a reverse gear shifting stage; a reverse driven gear geared with the reverse driving gear may be rotatably disposed on the third output shaft; and a reverse synchronizer may be provided to enable the reverse driven gear to be converted into a state in which it is connected to the third output shaft.

In a state in which the series synchronizer connects the third-stage driven gear and the sixth-stage driven gear and the reverse synchronizer connects the reverse driven gear to the third output shaft, the power of the first input shaft is sequentially transferred to the third-stage driving gear, the third-stage driven gear, the sixth-stage driven gear, the sixth-stage driving gear, the second-stage driving gear, the reverse driving gear and the reverse driven gear to form output with a reverse stage gear shift ratio to the third output shaft.

Furthermore, the combined gear group may include one pair of external gears including a fifth-stage driving gear mounted on the first input shaft and a fifth-stage driven gear mounted on the first output shaft for facilitating a fifth-gear shifting stage of a series of gear shifting stages to be implemented; the other pair of external gears including a sixth-stage driven gear mounted on the first output shaft and the sixth-stage driving gear mounted on the second input shaft for facilitating a sixth-gear shifting stage of a series of gear shifting stages to be implemented; and a series synchronizer provided to enable the fifth-stage driven gear and the sixth-stage driven gear to be connected to or disconnected from each other.

A third-seventh-stage driving gear may be mounted on the first input shaft in a state in which rotation thereof is restricted, to implement a third-gear shifting stage and the seventh-gear shifting stage of a series of gear shifting stages; a seventh-stage driven gear geared with the third-seventh-stage driving gear may be rotatably disposed on the first output shaft; and a third-stage driven gear geared with the third-seventh-stage driving gear may be rotatably disposed on the second output shaft.

A second-stage driving gear configured for implementing a second-gear shifting stage of a series of gear shifting stages and a fourth-stage driving gear configured for implementing a fourth-gear shifting stage may be fixed on the second input shaft; a second-stage driven gear geared with the second-stage driving gear may be rotatably disposed on the first output shaft; and a fourth-stage driven gear geared with the fourth-stage driving gear may be rotatably disposed on the second output shaft.

The dual clutch transmission may further include a first synchronizer provided to enable any one of the third-stage driven gear and the fourth-stage driven gear to be connected to the second output shaft; a second synchronizer provided to enable any one of the fifth-stage driven gear and the seventh-stage driven gear to be connected to the first output shaft; and a third synchronizer provided to enable any one of the second-stage driven gear and the sixth-stage driven gear to be connected to the first output shaft.

A second-stage driving gear configured for implementing a second-gear shifting stage of a series of gear shifting stages and a fourth-stage driving gear configured for implementing a fourth-gear shifting stage may be fixed on the second input shaft; a fourth-stage driven gear geared with the fourth-stage driving gear may be rotatably disposed on the first output shaft; and a second-stage driven gear geared with the second-stage driving gear may be rotatably disposed on the second output shaft.

The dual clutch transmission may further include a first synchronizer provided to enable any one of the third-stage driven gear and the second-stage driven gear to be connected to the second output shaft; a second synchronizer provided to enable any one of the fifth-stage driven gear and the seventh-stage driven gear to be connected to the first output shaft; and a third synchronizer provided to enable any one of the fourth-stage driven gear and the sixth-stage driven gear to be connected to the first output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 11 is a table summarizing operation modes of the dual clutch transmission shown in FIG. 1;

Figure 1:
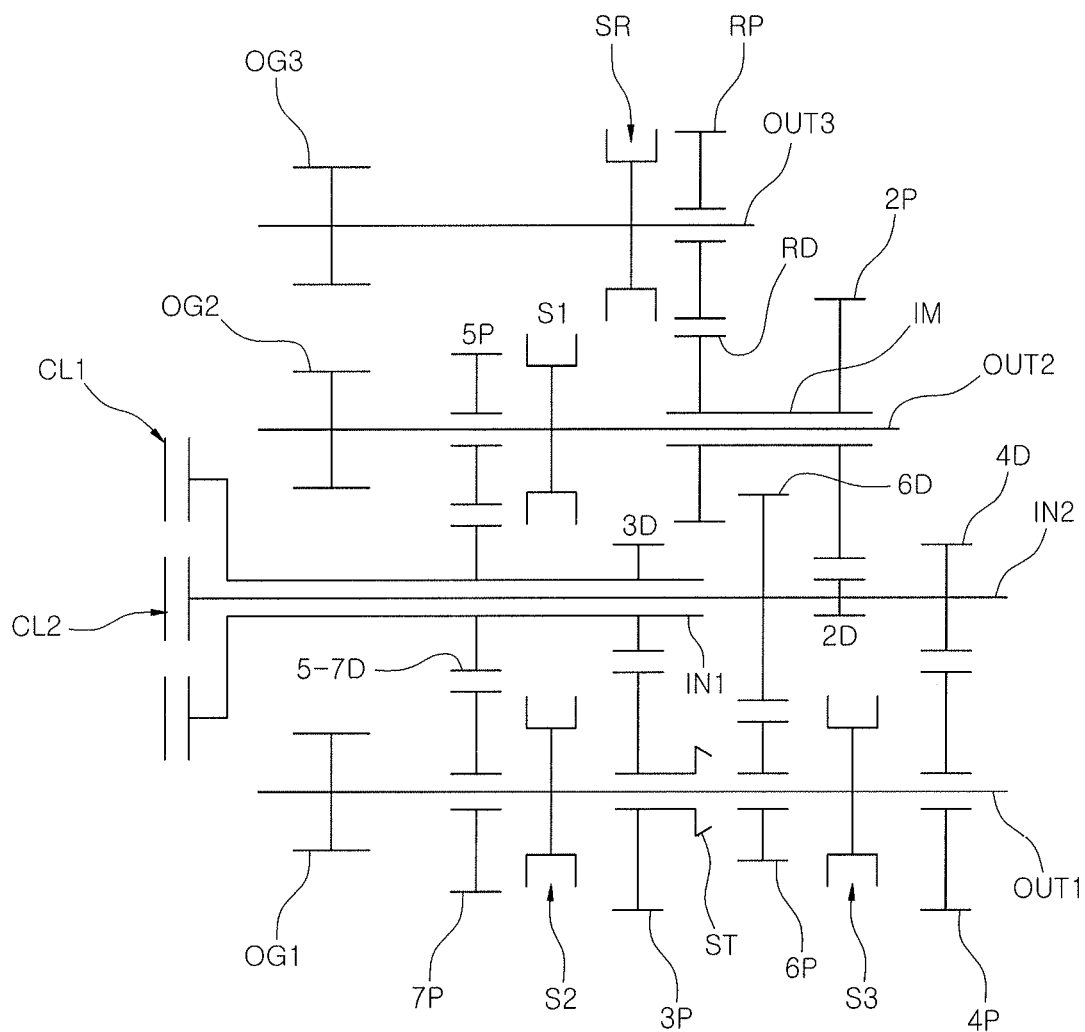
FIG. 1 is a diagram illustrating a configuration of various exemplary embodiments of a dual clutch transmission for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

A ducal clutch transmission for a vehicle according to the exemplary embodiments of the present invention will be described below with reference to the accompanying drawings.

Figure 12:
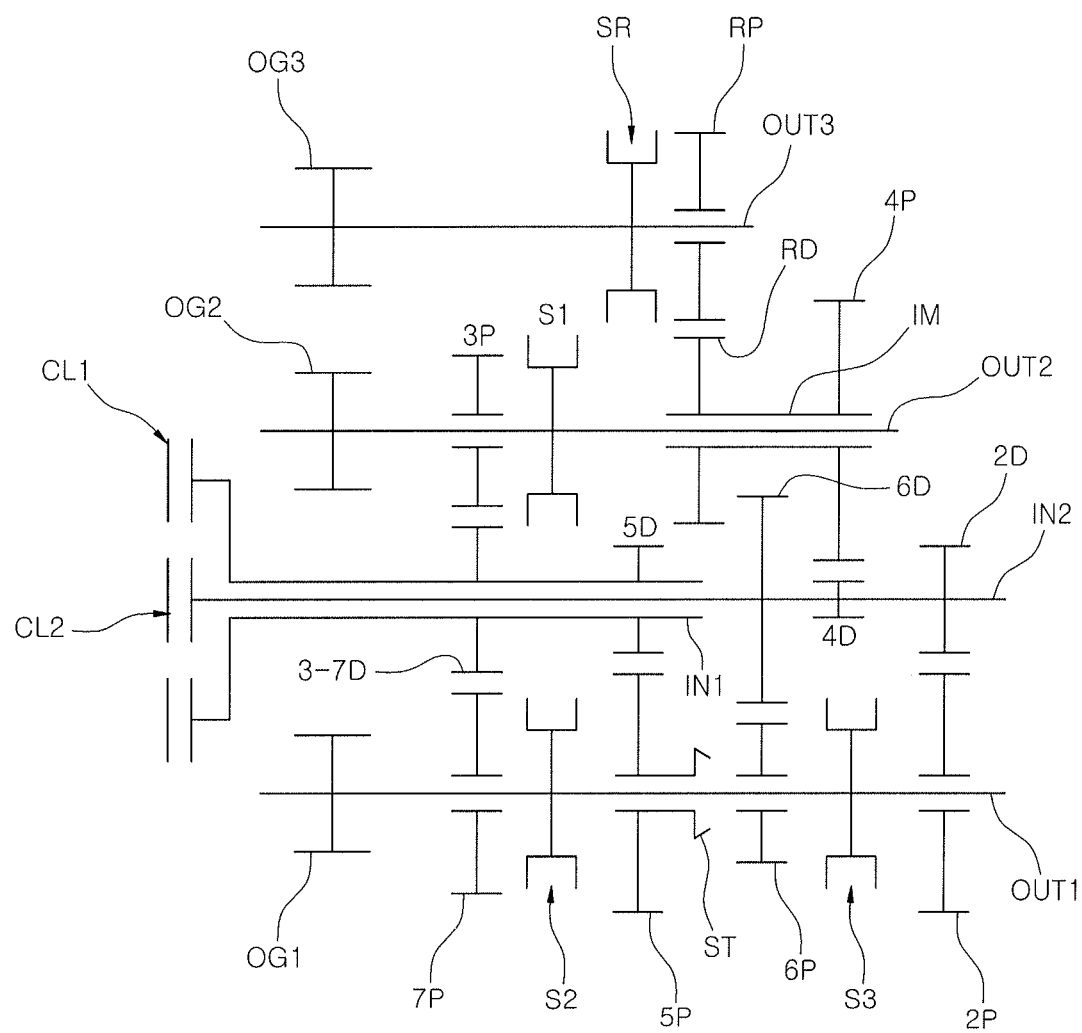
FIG. 12 is a view exemplarily illustrating various exemplary embodiments of the present invention.
Figure 13:
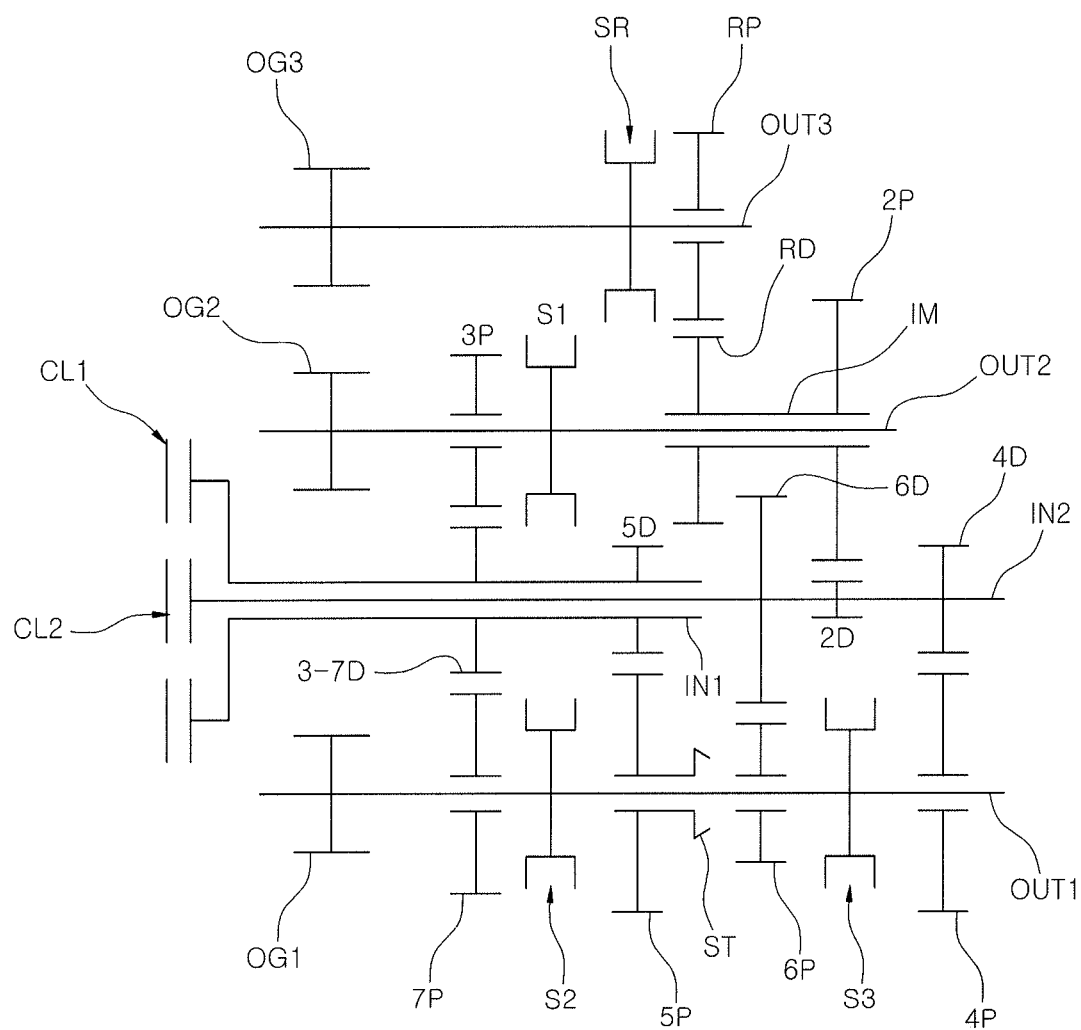
FIG. 13 is a view exemplarily illustrating various exemplary embodiments of the present invention.

Referring to FIGS. 1, 12 and 13, embodiments of a dual clutch transmission (DCT) for a vehicle according to an exemplary embodiment of the present invention commonly include a first input shaft IN1 to which a first clutch CL1 is mounted; a second input shaft IN2 disposed coaxially with the first input shaft IN1 and connected to a second clutch CL2; a first output shaft OUT1, a second output shaft OUT2 and a third output shaft OUT3 disposed in parallel with the first input shaft IN1 and the second input shaft IN2; and a combined gear group including two pairs of external gears configured to be connected in series to each other or disconnected from each other so that power of the first input shaft IN1 is decelerated in two steps using the first output shaft OUT1 to enable the second input shaft IN2 to be driven in a direction in which the first input shaft IN1 is driven.

In various exemplary embodiments shown in FIG. 1, the combined gear group may include one pair of external gears including a third-stage driving gear 3D mounted on the first input shaft IN1 and a third-stage driven gear 3P mounted on the first output shaft OUT1 for facilitating a third-gear shifting stage of a series of gear shifting stages to be implemented; the other pair of external gears including a sixth-stage driven gear 6P mounted on the first output shaft OUT1 and a sixth-stage driving gear 6D mounted on the second input shaft IN2 for facilitating a sixth-gear shifting stage of a series of gear shifting stages to be implemented; and a series synchronizer ST provided to enable the third-stage driven gear 3P and the sixth-stage driven gear 6P to be connected to or disconnected from each other.

The third-stage driving gear 3D and the third-stage driven gear 3P forming the combined gear group may independently form a third stage gear shift ratio, the sixth-stage driving gear 6D and the sixth-stage driven gear 6P may independently form a sixth stage gear shift ratio, and the above-mentioned gears are also used to implement a specific gear shifting stage of a series of gear shifting stages. As a result, only a small number of gears may be employed as compared with the total number of gear shifting stages to be implemented, so that the total length of the dual clutch transmission may be reduced.

In an exemplary embodiment of the present invention, the third-stage driving gear 3D, the third-stage driven gear 3P and the sixth-stage driving gear 6D and the sixth-stage driven gear 6P are also employed for implementing a first-gear shifting stage and an eighth-gear shifting stage as described below, and the dual clutch transmission according to the exemplary embodiment of the present invention is not provided with separate gear for implementing the first and eighth-gear shifting stages.

In an exemplary embodiment of the present invention, the third-stage driving gear 3D is disposed on the first input shaft IN1 in a state in which rotation thereof is restricted; the third-stage driven gear 3P and the sixth-stage driven gear 6P are rotatably disposed on the first output shaft OUT1; and the sixth-stage driving gear 6D is disposed on the second input shaft IN2 in a state in which rotation thereof is restricted.

Accordingly, in a state in which the series synchronizer ST connects the third-stage driven gear 3P and the sixth-stage driven gear 6P, the third-stage driven gear 3P and the sixth-stage driven gear 6P may be integrally rotated regardless of the first output shaft OUT1. Consequently, when the external gear pair of the third-stage driving gear 3D and the third-stage driven gear 3P are connected in series to the external gear pair of the sixth-stage driven gear 6P and the sixth-stage driving gear 6D, the power of the first input shaft IN1 is decelerated in two steps to enable the second input shaft IN2 to be decelerated and driven in the direction in which the first input shaft IN1 is rotated.

A fifth-seventh-stage driving gear 5-7D is mounted on the first input shaft IN1 in a state in which rotation thereof is restricted, to implement a fifth-gear shifting stage and a seventh-gear shifting stage of a series of gear shifting stages; a seventh-stage driven gear 7P geared with the fifth-seventh-stage driving gear 5-7D is rotatably disposed on the first output shaft OUT1; and a fifth-stage driven gear 5P geared with the fifth-seventh-stage driving gear 5-7D is rotatably disposed on the second output shaft OUT2.

Therefore, the present dual clutch transmission has the advantage in that since the driving gear for implementing the fifth and seventh-gear shifting stages may include one fifth-seventh-stage driving gear 5-7D, the number of required gears is reduced, and thus the total length and the weight of the dual clutch transmission are reduced.

A second-stage driving gear 2D configured for implementing a second-gear shifting stage of a series of gear shifting stages and a fourth-stage driving gear 4D configured for implementing a fourth-gear shifting stage are mounted on the second input shaft IN2 in a state in which rotations thereof are restricted; a fourth-stage driven gear 4P geared with the fourth-stage driving gear 4D is rotatably disposed on the first output shaft OUT1; and a second-stage driven gear 2P geared with the second-stage driving gear 2D is rotatably disposed on the second output shaft OUT2.

Furthermore, the exemplary embodiment may include a first synchronizer S1 provided to enable any one of the second-stage driven gear 2P and the fifth-stage driven gear 5P to be connected to the second output shaft OUT2; a second synchronizer S2 provided to enable any one of the third-stage driven gear 3P and the seventh-stage driven gear 7P to be connected to the first output shaft OUT1; and a third synchronizer S3 provided to enable any one of the fourth-stage driven gear 4P and the sixth-stage driven gear 6P to be connected to the first output shaft OUT1.

In an exemplary embodiment of the present invention, in addition, a reverse driving gear RD is integrally formed on the second-stage driven gear 2P though the intermediate shaft IM for implementing a reverse gear shifting stage; a reverse driven gear RP geared with the reverse driving gear RD is rotatably disposed on the third output shaft OUT3; and a reverse synchronizer SR is provided to enable the reverse driven gear RP to be converted into a state in which it is connected to the third output shaft OUT3.

Figure 2:
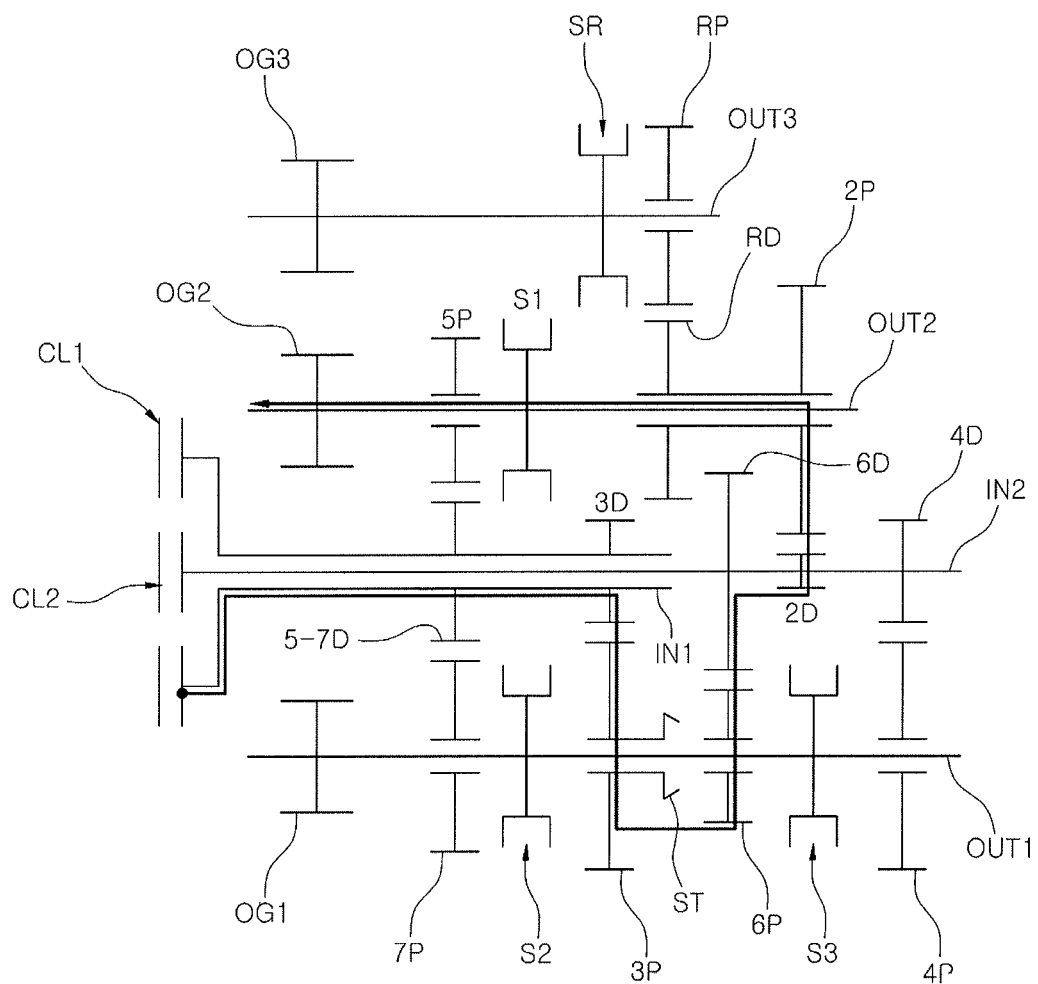
FIG. 2, FIG. 3, FIG. 4, FIG. 5, FIG. 6, FIG. 7, FIG. 8, and FIG. 9 are views for describing that the dual clutch transmission shown in FIG. 1 implements a first forward-gear shifting stage to an eighth forward-gear shifting stage, respectively.

Although the various exemplary embodiments of FIG. 1 configured as described above is not provided with a separate gear for implementing the first-gear shifting stage, but implements the first-gear shifting stage as illustrated in FIG. 2.

That is, in a state in which the first clutch CL1 is engaged, the series synchronizer ST connects the third-stage driven gear 3P and the sixth-stage driven gear 6P and the first synchronizer S1 connects the second-stage driven gear 2P to the second output shaft OUT2, the power of the first input shaft IN1 is sequentially transferred to the third-stage driving gear 3D, the third-stage driven gear 3P, the sixth-stage driven gear 6P, the sixth-stage driving gear 6D, the second-stage driving gear 2D and the second-stage driven gear 2P to form output with a first stage gear shift ratio to the second output shaft OUT2.

Of course, a first output gear OG1, a second output gear OG2 and a third output gear OG3 may be mounted on the first output shaft OUT1, the second output shaft OUT2 and the third output shaft OUT3, respectively, to allow the power to be transferred to drive wheels through a ring gear of a differential which is commonly geared with the above output gears.

Figure 3:
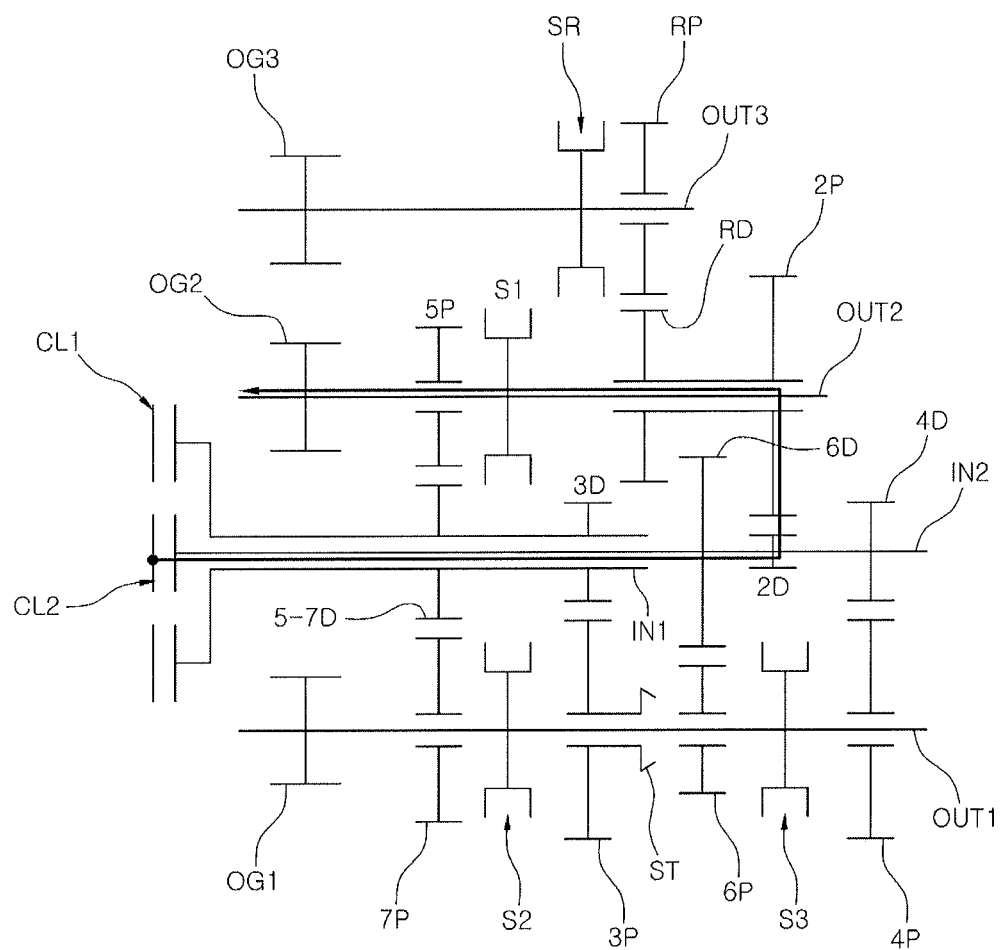
Figure 4:
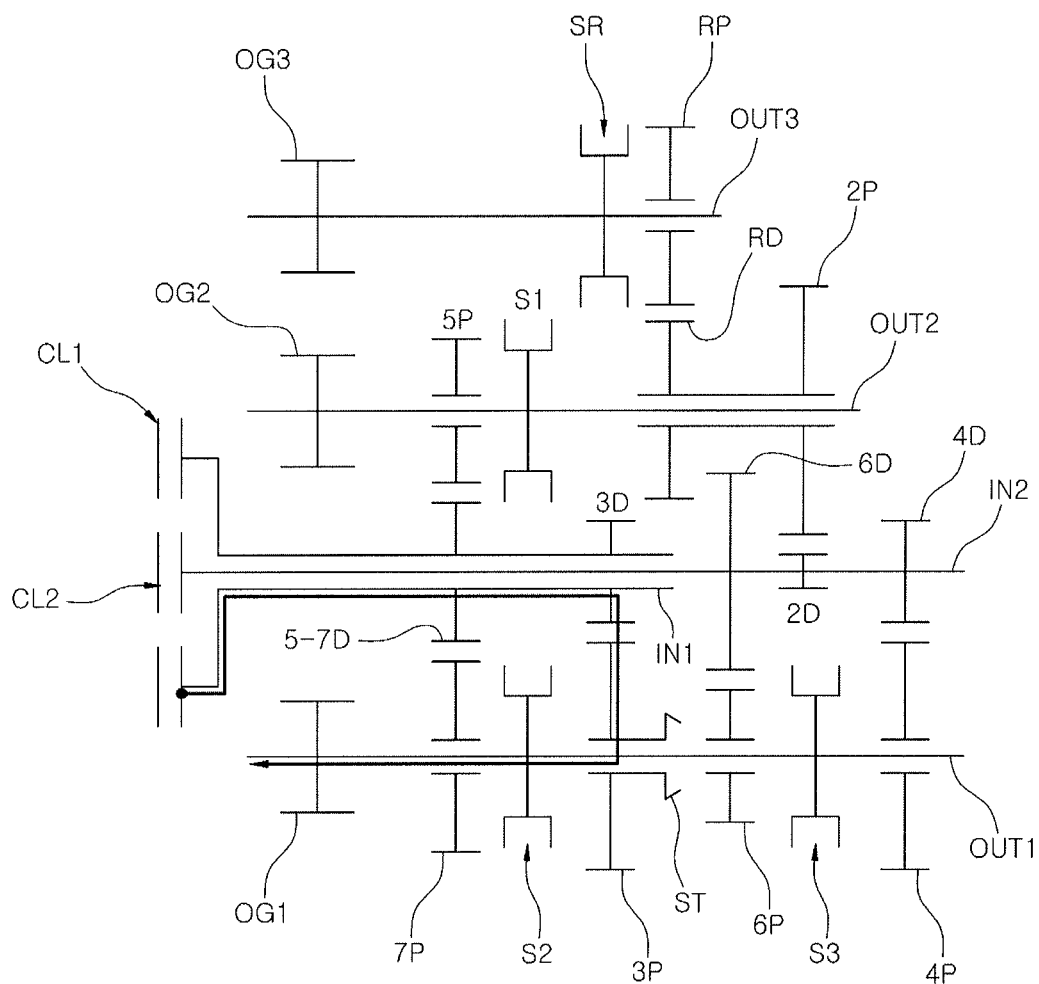
Figure 5:
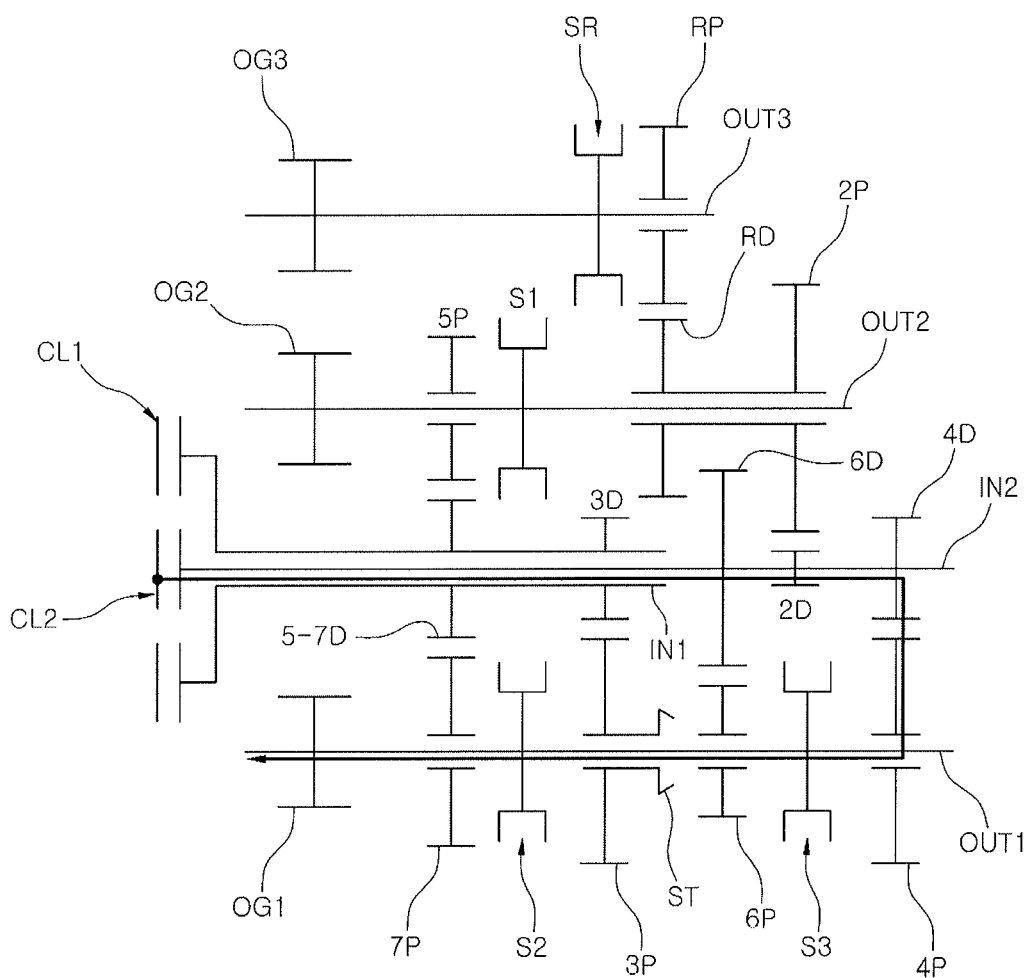
Figure 6:
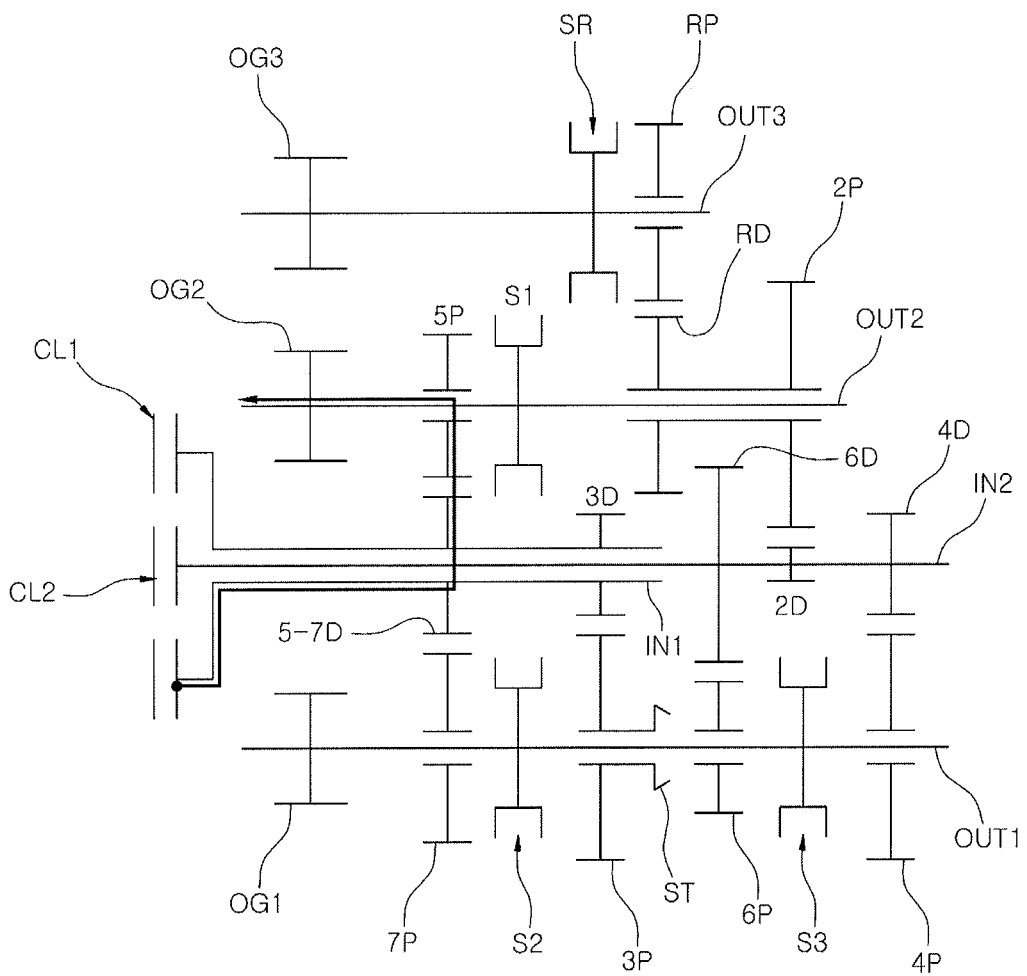
Figure 7:
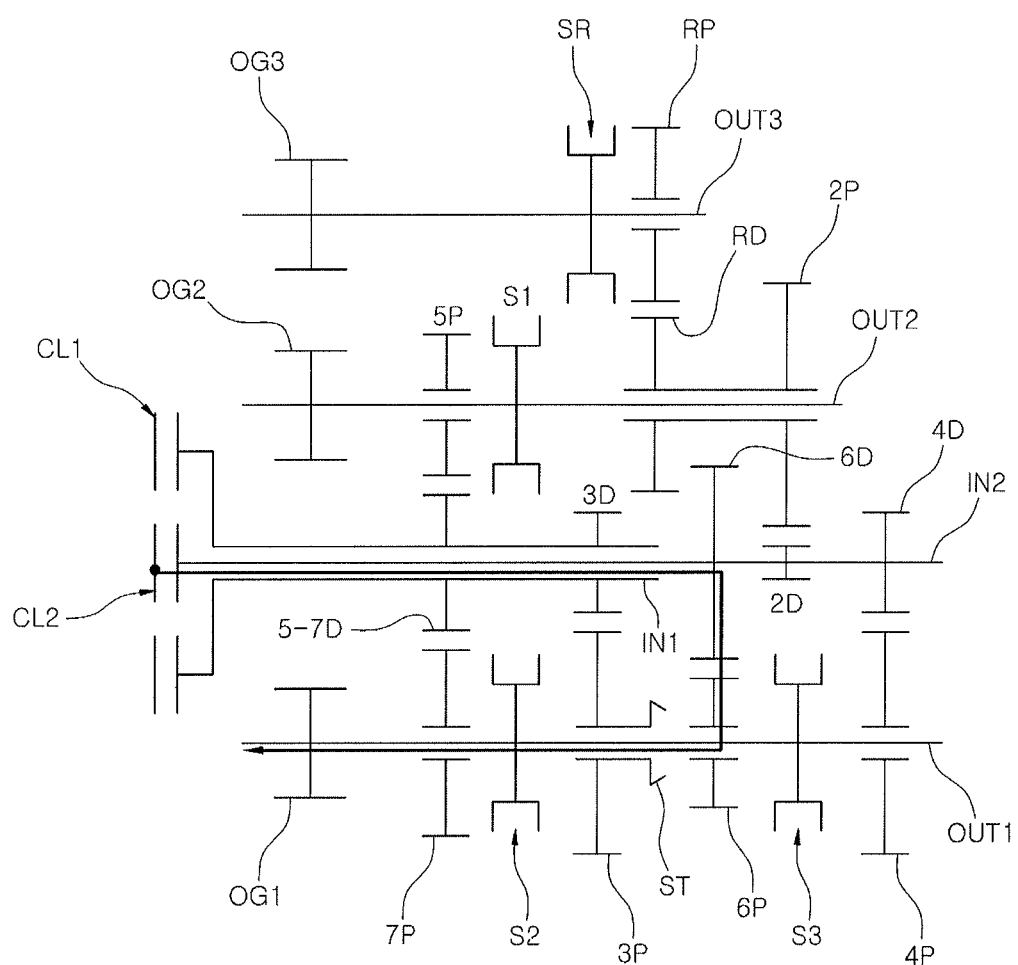
Figure 8:
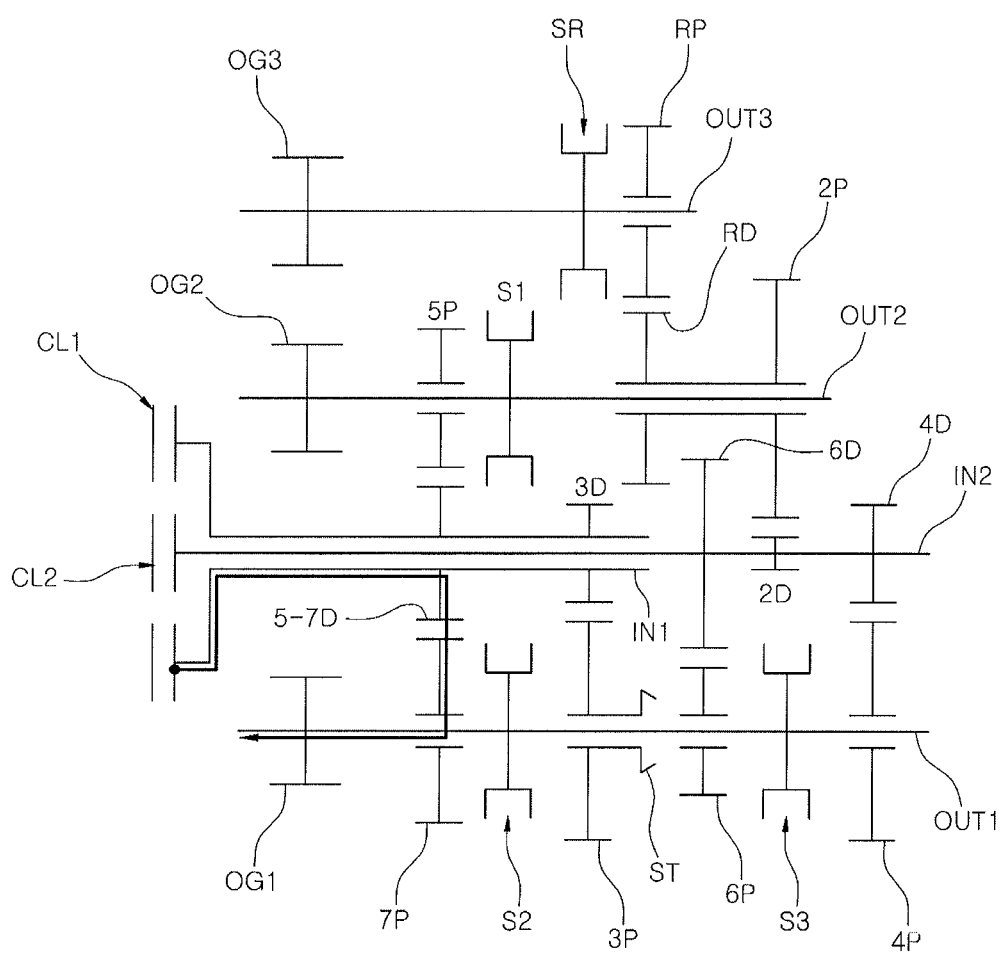

The second-gear shifting stage is implemented from a state shown in FIG. 2 by releasing the first clutch CL1 from the series synchronizer ST and by engaging the second clutch CL2, and has a power flow as shown in FIG. 3.

Subsequently, the third-gear shifting stage to the seventh-gear shifting stage have power flows as illustrated in FIG. 4, FIG. 5, FIG. 6, FIG. 7, and FIG. 8, respectively, and like the gear shift process in the conventional dual clutch transmission, a gear shift process between the adjacent gear shifting stages is implemented by engaging one of the first clutch CL1 and the second clutch CL2 and releasing the other in accordance with an operation mode table shown in FIG. 11 in a state where the gear corresponding to each of the target shifting stages is engaged with the synchronizer.

Figure 9:
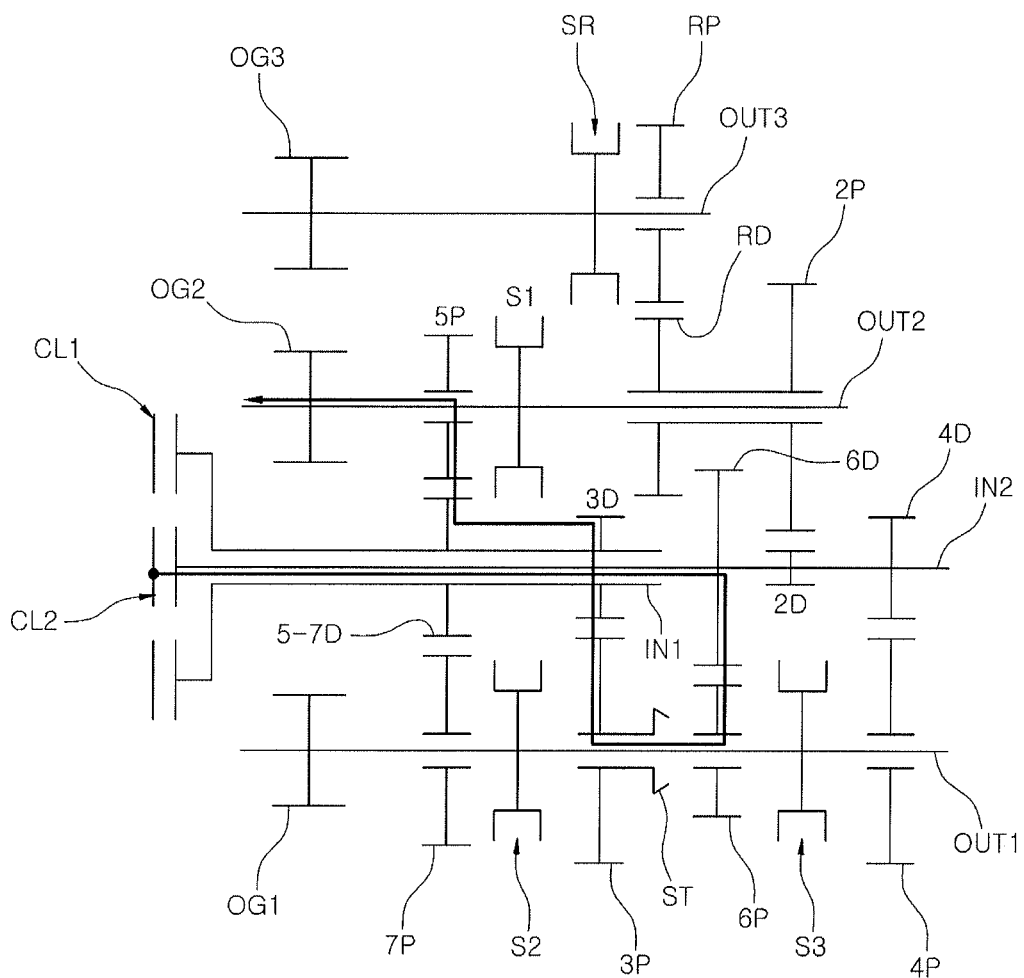

FIG. 9 illustrates the eighth-gear shifting stage implemented in the exemplary embodiment shown in FIG. 1. In a state in which the second clutch CL2 is engaged, the series synchronizer ST connects the third-stage driven gear 3P and the sixth-stage driven gear 6P and the first synchronizer S1 connects the fifth-stage driven gear 5P to the second output shaft OUT2, the power of the second input shaft IN2 is sequentially transferred to the sixth-stage driving gear 6D, the sixth-stage driven gear 6P, the third-stage driven gear 3P, the third-stage driving gear 3D, the fifth-seventh-stage driving gear 5-7D and the fifth-stage driven gear 5P to form the output with an eighth stage gear shift ratio to the second output shaft OUT2.

Figure 10:
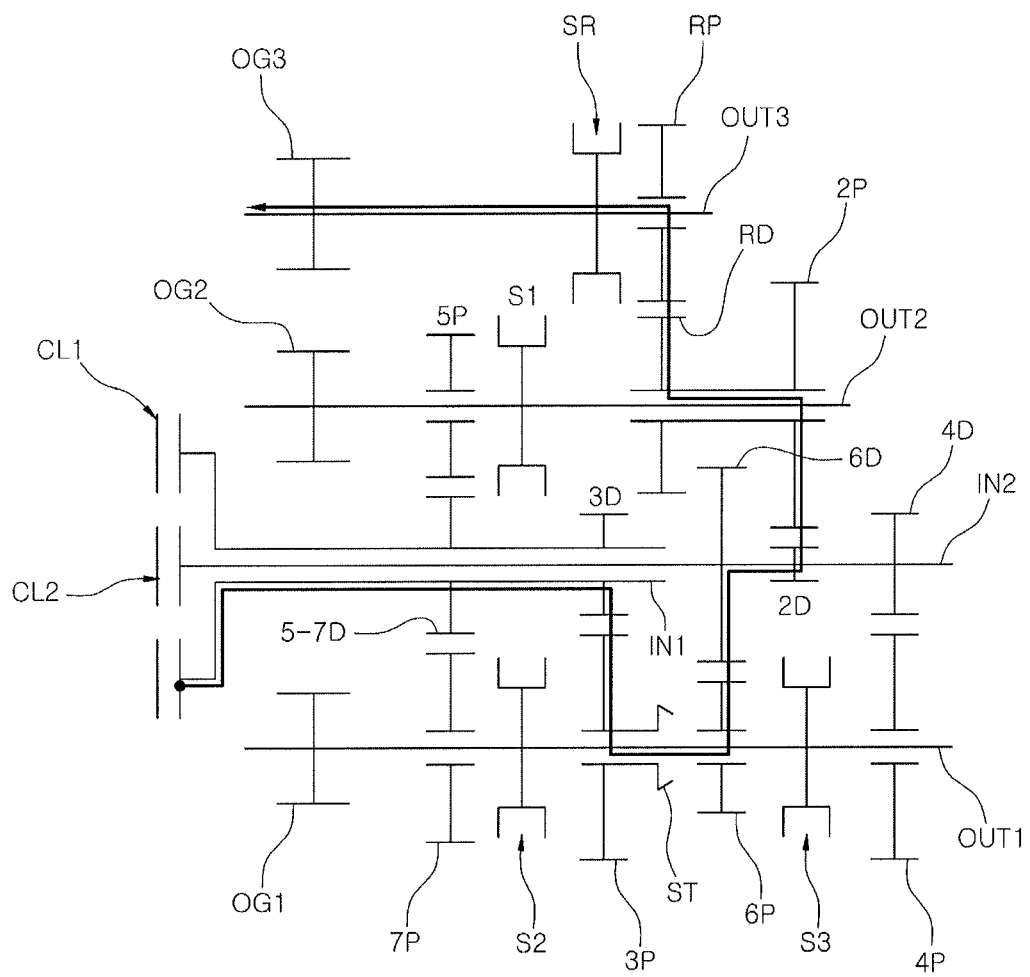
FIG. 10 is a view for describing that the dual clutch transmission shown in FIG. 1 implements a reverse gear shifting stage.

FIG. 10 illustrates a reverse-gear shifting stage implemented in the exemplary embodiment shown in FIG. 1, in a state in which the second clutch CL2 is engaged, the series synchronizer ST connects the third-stage driven gear 3P and the sixth-stage driven gear 6P and the reverse synchronizer SR connects the reverse driven gear RP to the third output shaft OUT3, the power of the first input shaft IN1 is sequentially transferred to the third-stage driving gear 3D, the third-stage driven gear 3P, the sixth-stage driven gear 6P, the sixth-stage driving gear 6D, the second-stage driving gear 2D, the reverse driving gear RD and the reverse driven gear RP to form output with a reverse stage gear shift ratio to the third output shaft OUT3.

As described above, the various exemplary embodiments illustrated in FIG. 1 implements the first-gear shifting stage and the eighth-gear shifting stage utilizing the gears implementing another gear shifting stage of a series of gear shifting stages without using any separate gears, and thus it is possible to reduce the number of components to be used, reducing the entire of the dual clutch transmission and enhancing vehicle mountability.

In various exemplary embodiments shown in FIG. 12 and various exemplary embodiments shown in FIG. 13, the combined gear groups commonly include one pair of external gears including a fifth-stage driving gear 5D mounted on the first input shaft IN1 and the fifth-stage driven gear 5P mounted on the first output shaft OUT1 for facilitating the fifth-gear shifting stage of a series of gear shifting stages to be implemented; the other pair of external gears including the sixth-stage driven gear 6P mounted on the first output shaft OUT1 and the sixth-stage driving gear 6D mounted on the second input shaft IN2 for facilitating the sixth-gear shifting stage of a series of gear shifting stages to be implemented; and the series synchronizer ST provided to enable the fifth-stage driven gear 5P and the sixth-stage driven gear 6P to be connected to or disconnected from each other.

As the rest of the configuration of the various exemplary embodiments shown in FIG. 12, a third-seventh-stage driving gear 3-7D is mounted on the first input shaft IN1 in a state in which rotation thereof is restricted, for implementing the third-gear shifting stage and the seventh-gear shifting stage of a series of gear shifting stages; the seventh-stage driven gear 7P geared with the third-seventh-stage driving gear 3-7D is rotatably disposed on the first output shaft OUT1; and the third-stage driven gear 3P geared with the third-seventh-stage driving gear 3-7D is rotatably disposed on the second output shaft OUT2.

Furthermore, the second-stage driving gear 2D configured for implementing the second-gear shifting stage of a series of gear shifting stages and the fourth-stage driving gear 4D configured for implementing the fourth-gear shifting stage are mounted on the second input shaft IN2 in a state in which rotations thereof are restricted; the second-stage driven gear 2P geared with the second-stage driving gear 2D is rotatably disposed on the first output shaft OUT1; and the fourth-stage driven gear 4P geared with the fourth-stage driving gear 4D is rotatably disposed on the second output shaft OUT2.

Furthermore, the various exemplary embodiments may include the first synchronizer S1 provided to enable any one of the third-stage driven gear 3P and the fourth-stage driven gear 4P to be connected to the second output shaft OUT2; the second synchronizer S2 provided to enable any one of the fifth-stage driven gear 5P and the seventh-stage driven gear 7P to be connected to the first output shaft OUT1; and the third synchronizer S3 provided to enable any one of the second-stage driven gear 2P and the sixth-stage driven gear 6P to be connected to the first output shaft OUT1.

In other words, as compared with the various exemplary embodiments illustrated in FIG. 1, the third-stage gears and the fifth-stage gears are disposed so that their positions are changed with each other, and the second-stage gears and the fourth-stage gears are disposed so that their positions are changed with each other.

In the above described configuration, by implementing the first-gear shifting stage through the fifth-stage driving gear 5D, the fifth-stage driven gear 5P, the sixth-stage driven gear 6P, the sixth-stage driving gear 6D, the second-stage driving gear 2D, the second-stage driven gear 2P and the first output shaft OUT1, as compared with the first-gear shifting stage implemented in the various exemplary embodiments of the present invention, it is possible to form a first stage gear ratio larger, and thus a gear span may be increased.

A configuration of the combined gear group of the various exemplary embodiments illustrated in FIG. 13 is identical with that of the various exemplary embodiments of the present invention, only the following configuration is different.

That is, the second-stage driving gear 2D configured for implementing the second-gear shifting stage of a series of gear shifting stages and the fourth-stage driving gear 4D configured for implementing the fourth-gear shifting stage are mounted on the second input shaft IN2 in a state in which rotations thereof are restricted; the fourth-stage driven gear 4P geared with the fourth-stage driving gear 4D is rotatably disposed on the first output shaft OUT1; and the second-stage driven gear 2P geared with the second-stage driving gear 2D is rotatably disposed on the second output shaft OUT2.

Furthermore, the various exemplary embodiments includes the first synchronizer S1 provided to enable any one of the third-stage driven gear 3P and the second-stage driven gear 2P to be connected to the second output shaft OUT2; the second synchronizer S2 provided to enable any one of the fifth-stage driven gear 5P and the seventh-stage driven gear 7P to be connected to the first output shaft OUT1; and the third synchronizer S3 provided to enable any one of the fourth-stage driven gear 4P and the sixth-stage driven gear 6P to be connected to the first output shaft OUT1.

In other words, as compared with the various exemplary embodiments illustrated in FIG. 1, the third-stage gears and the fifth-stage gears are disposed so that their positions are changed with each other.

The above described configuration, by implementing the first-gear shifting stage through the fifth-stage driving gear 5D, the fifth-stage driven gear 5P, the sixth-stage driven gear 6P, the sixth-stage driving gear 6D, the second-stage driving gear 2D, the second-stage driven gear 2P and the second output shaft OUT2, as compared with the first-gear shifting stage implemented in the various exemplary embodiments shown in FIG. 1, it is possible to make the first stage gear ratio smaller, and thus a gear span may be reduced.

According to an exemplary embodiment of the present invention, since a plurality of gear shifting stages including the eighth forward-gear shifting stage or more may be implemented, it is possible to improve fuel efficiency of a vehicle, and since an entire overall length of the transmission may be relatively short, which can improve vehicle mountability of the dual clutch transmission.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual clutch transmission for a vehicle, the dual clutch transmission comprising:
   a first input shaft to which a first clutch is connected;
   a second input shaft to which a second clutch is connected, the second input shaft being mounted coaxially with the first input shaft;
   a first output shaft, a second output shaft and a third output shaft mounted in parallel with the first input shaft and the second input shaft; and
   a combined gear group including first and second pairs of external gears configured to be connected in series to each other or disconnected from each other so that an output of the first input shaft is decelerated in at least two steps using the first output shaft to enable the second input shaft to be driven in a direction in which the first input shaft is driven,
   wherein the combined gear group includes:
   the first pair of external gears having a third-stage driving gear mounted on the first input shaft and a third-stage driven gear mounted on the first output shaft to implement a third-gear shifting stage among a series of gear shifting stages;
   the second pair of external gears having a sixth-stage driven gear mounted on the first output shaft and a sixth-stage driving gear mounted on the second input shaft to implement a sixth-gear shifting stage among the series of gear shifting stages; and
   a series synchronizer configured to selectively connect the third-stage driven gear and the sixth-stage driven gear.

2. The dual clutch transmission for the vehicle of claim 1, wherein the third-stage driving gear is fixed on the first input shaft;
   wherein the third-stage driven gear and the sixth-stage driven gear are rotatably mounted on the first output shaft; and
   wherein the sixth-stage driving gear is fixed on the second input shaft.

3. The dual clutch transmission for the vehicle of claim 1, wherein a fifth-seventh-stage driving gear is fixed on the first input shaft, to implement a fifth-gear shifting stage and a seventh-gear shifting stage among the series of gear shifting stages;
   wherein a seventh-stage driven gear geared with the fifth-seventh-stage driving gear is rotatably mounted on the first output shaft; and
   wherein a fifth-stage driven gear geared with the fifth-seventh-stage driving gear is rotatably mounted on the second output shaft.

4. The dual clutch transmission for the vehicle of claim 3, wherein a second-stage driving gear configured for implementing a second-gear shifting stage among the series of gear shifting stages and a fourth-stage driving gear configured for implementing a fourth-gear shifting stage among the series of gear shifting stages are fixed on the second input shaft;
   wherein a fourth-stage driven gear geared with the fourth-stage driving gear is rotatably mounted on the first output shaft; and
   wherein a second-stage driven gear geared with the second-stage driving gear is rotatably mounted on the second output shaft.

5. The dual clutch transmission for the vehicle of claim 4, further including:
   a first synchronizer configured to selectively connect one of the second-stage driven gear and the fifth-stage driven gear to the second output shaft;
   a second synchronizer configured to selectively connect one of the third-stage driven gear and the seventh-stage driven gear to the first output shaft; and
   a third synchronizer configured to selectively connect one of the fourth-stage driven gear and the sixth-stage driven gear to the first output shaft.

6. The dual clutch transmission for the vehicle of claim 5, wherein, while the series synchronizer connects the third-stage driven gear and the sixth-stage driven gear and the first synchronizer connects the second-stage driven gear to the second output shaft, power of the first input shaft is sequentially transferred to the third-stage driving gear, the third-stage driven gear, the sixth-stage driven gear, the sixth-stage driving gear, the second-stage driving gear and the second-stage driven gear to output a power with a predetermined stage gear shift ratio to the second output shaft.

7. The dual clutch transmission for the vehicle of claim 5, wherein, while the series synchronizer connects the third-stage driven gear and the sixth-stage driven gear and the first synchronizer connects the fifth-stage driven gear to the second output shaft, power of the second input shaft is sequentially transferred to the sixth-stage driving gear, the sixth-stage driven gear, the third-stage driven gear, the third-stage driving gear, the fifth-seventh-stage driving gear and the fifth-stage driven gear to output a power with another predetermined stage gear shift ratio to the second output shaft.

8. The dual clutch transmission for the vehicle of claim 5, wherein a reverse driving gear is fixed on the second-stage driven gear and rotatably mounted on the second output shaft for implementing a reverse gear shifting stage among the series of gear shifting stages;
wherein a reverse driven gear geared with the reverse driving gear is rotatably mounted on the third output shaft; and
wherein a reverse synchronizer is configured to selectively connect the reverse driven gear to the third output shaft.

9. The dual clutch transmission for the vehicle of claim 8, wherein, while the series synchronizer connects the third-stage driven gear and the sixth-stage driven gear and the reverse synchronizer connects the reverse driven gear to the third output shaft, power of the first input shaft is sequentially transferred to the third-stage driving gear, the third-stage driven gear, the sixth-stage driven gear, the sixth-stage driving gear, the second-stage driving gear, the reverse driving gear and the reverse driven gear to output a power with a predetermined reverse stage gear shift ratio to the third output shaft.

10. A dual clutch transmission for a vehicle, the dual clutch transmission comprising: a first input shaft to which a first clutch is connected;
a second input shaft to which a second clutch is connected, the second input shaft being mounted coaxially with the first input shaft;
a first output shaft, a second output shaft and a third output shaft mounted in parallel with the first input shaft and the second input shaft; and
a combined gear group including first and second pairs of external gears configured to be connected in series to each other or disconnected from each other so that an output of the first input shaft is decelerated in at least two steps using the first output shaft to enable the second input shaft to be driven in a direction in which the first input shaft is driven,
wherein the combined gear group includes:
a first pair of external gears including a fifth-stage driving gear mounted on the first input shaft and a fifth-stage driven gear mounted on the first output shaft for facilitating a fifth-gear shifting stage among a series of gear shifting stages to be implemented;
a second pair of external gears including a sixth-stage driven gear mounted on the first output shaft and a sixth-stage driving gear mounted on the second input shaft for implementing a sixth-gear shifting stage among the series of gear shifting stages; and
a series synchronizer configured to selectively connect the fifth-stage driven gear and the sixth-stage driven gear to each other.

11. The dual clutch transmission for the vehicle of claim 10,
wherein a third-seventh-stage driving gear is fixed on the first input shaft, to implement a third-gear shifting stage and a seventh-gear shifting stage among the series of gear shifting stages;
wherein a seventh-stage driven gear geared with the third-seventh-stage driving gear is rotatably mounted on the first output shaft; and
wherein a third-stage driven gear geared with the third-seventh-stage driving gear is rotatably mounted on the second output shaft.

12. The dual clutch transmission for the vehicle of claim 11,
wherein a second-stage driving gear configured for implementing a second-gear shifting stage among the series of gear shifting stages and a fourth-stage driving gear configured for implementing a fourth-gear shifting stage among the series of gear shifting stages are fixed on the second input shaft;
wherein a second-stage driven gear geared with the second-stage driving gear is rotatably mounted on the first output shaft; and
wherein a fourth-stage driven gear geared with the fourth-stage driving gear is rotatably mounted on the second output shaft.

13. The dual clutch transmission for the vehicle of claim 12, further including:
a first synchronizer configured to selectively connect one of the third-stage driven gear and the fourth-stage driven gear to the second output shaft;
a second synchronizer configured to selectively connect one of the fifth-stage driven gear and the seventh-stage driven gear to the first output shaft; and
a third synchronizer configured to selectively connect one of the second-stage driven gear and the sixth-stage driven gear to the first output shaft.

14. The dual clutch transmission for the vehicle of claim 13,
wherein a reverse driving gear is fixed on the fourth-stage driven gear and rotatably mounted on the second output shaft for implementing a reverse gear shifting stage among the series of gear shifting stages;
wherein a reverse driven gear geared with the reverse driving gear is rotatably mounted on the third output shaft; and
wherein a reverse synchronizer is configured to selectively connect the reverse driven gear to the third output shaft.

15. The dual clutch transmission for the vehicle of claim 11,
wherein a second-stage driving gear configured for implementing a second-gear shifting stage among the series of gear shifting stages and a fourth-stage driving gear configured for implementing a fourth-gear shifting stage among the series of gear shifting stages are fixed on the second input shaft;
wherein a fourth-stage driven gear geared with the fourth-stage driving gear is rotatably mounted on the first output shaft; and
wherein a second-stage driven gear geared with the second-stage driving gear is rotatably mounted on the second output shaft.

16. The dual clutch transmission for the vehicle of claim 15, further including:

a first synchronizer configured to selectively connect one of the third-stage driven gear and the second-stage driven gear to the second output shaft;

a second synchronizer configured to selectively connect the fifth-stage driven gear and the seventh-stage driven gear to the first output shaft; and a third synchronizer configured to selectively connect one of the fourth-stage driven gear and the sixth-stage driven gear to the first output shaft.

17. The dual clutch transmission for the vehicle of claim 16, wherein a reverse driving gear is fixed on the second-stage driven gear and rotatably mounted on the second output shaft for implementing a reverse gear shifting stage among the series of gear shifting stages;

wherein a reverse driven gear geared with the reverse driving gear is rotatably mounted on the third output shaft; and wherein a reverse synchronizer is configured to selectively connect the reverse driven gear to the third output shaft.

* * * * *